(12) United States Patent
Lean et al.

(10) Patent No.: US 9,486,812 B2
(45) Date of Patent: Nov. 8, 2016

(54) FLUIDIC STRUCTURES FOR MEMBRANELESS PARTICLE SEPARATION

(75) Inventors: Meng H. Lean, Santa Clara, CA (US); Jeonggi Seo, Albany, CA (US); Ashutosh Kole, Sunnyvale, CA (US); Armin R. Volkel, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/120,093

(22) Filed: May 13, 2008

(65) Prior Publication Data

US 2009/0283455 A1    Nov. 19, 2009

(51) Int. Cl.
| | |
|---|---|
| *B03B 5/62* | (2006.01) |
| *B03B 5/32* | (2006.01) |
| *B03B 13/00* | (2006.01) |
| *B04C 1/00* | (2006.01) |
| *B04C 11/00* | (2006.01) |
| *B01D 21/26* | (2006.01) |

(52) U.S. Cl.
CPC ............. *B03B 5/626* (2013.01); *B01D 21/265* (2013.01); *B03B 5/32* (2013.01); *B03B 13/00* (2013.01); *B04C 1/00* (2013.01); *B04C 11/00* (2013.01)

(58) Field of Classification Search
CPC ....... B01D 21/265; B03B 5/52; B03B 5/626; B03B 13/00; B04C 1/00; B04C 11/00
USPC ......................... 209/362, 434, 459
See application file for complete search history.

(56) References Cited

U.S. PATENT DOCUMENTS

| | | | |
|---|---|---|---|
| 1,133,721 A | 3/1915 | Gregg | |
| 1,836,758 A | 12/1931 | Knapp | |
| 2,198,819 A * | 4/1940 | Holm | ............................ 210/304 |
| 2,426,804 A | 9/1947 | Roy | |
| 2,584,976 A | 2/1952 | Bailey, Jr. | |
| 2,615,572 A | 10/1952 | Hodge | |
| 3,225,523 A | 12/1965 | Wiebe | |
| 3,672,503 A | 6/1972 | Mark | |
| 3,693,791 A | 9/1972 | Beck | |
| 3,893,921 A | 7/1975 | Walther et al. | |
| 3,933,642 A | 1/1976 | Wilson | |
| 3,948,771 A * | 4/1976 | Bielefeldt | ..................... 210/779 |

(Continued)

FOREIGN PATENT DOCUMENTS

| | | |
|---|---|---|
| CA | 2311747 | 12/2000 |
| CN | 1149556 | 5/1997 |

(Continued)

OTHER PUBLICATIONS

Partial European Search Report , EP 09 15 6593, Oct. 19, 2009.

(Continued)

*Primary Examiner* — Joseph C Rodriguez
(74) *Attorney, Agent, or Firm* — Fay Sharpe LLP

(57) ABSTRACT

Fluidic structures for facilitating particle separation in curved or spiral devices are provided. The contemplated systems relate to various fluidic structures, implementations and selected fabrication techniques to realize construction of fluidic separation structures that are of a stacked and/or parallel configuration. These contemplated systems provide for efficient input of fluid to be processed, improved throughput, and, in some variations, adjustable and efficient treatment of output fluid.

27 Claims, 19 Drawing Sheets

(56) References Cited

U.S. PATENT DOCUMENTS

| | | | |
|---|---|---|---|
| 4,001,121 A * | 1/1977 | Bielefeldt | 210/512.3 |
| 4,128,474 A | 12/1978 | Ennis | |
| 4,153,541 A | 5/1979 | Rumpf et al. | |
| 4,159,942 A | 7/1979 | Greer et al. | |
| 4,189,378 A | 2/1980 | Wright et al. | |
| 4,292,050 A | 9/1981 | Linhardt et al. | |
| 4,324,334 A * | 4/1982 | Wright et al. | 209/459 |
| 4,343,707 A | 8/1982 | Lucas | |
| 4,383,917 A | 5/1983 | Wells | |
| 4,386,519 A * | 6/1983 | Sinkey | 73/61.66 |
| 4,451,367 A | 5/1984 | Ruggeri | |
| 4,460,391 A * | 7/1984 | Muller et al. | 55/343 |
| 4,462,907 A | 7/1984 | Waldecker | |
| 4,505,811 A * | 3/1985 | Griffiths et al. | 209/13 |
| 4,542,775 A | 9/1985 | Beck | |
| 4,664,789 A * | 5/1987 | Lees et al. | 209/459 |
| 4,795,553 A | 1/1989 | Giffard | |
| 4,872,972 A | 10/1989 | Wakabayashi et al. | |
| 4,927,437 A | 5/1990 | Richerson | |
| 5,059,226 A | 10/1991 | Schneider et al. | |
| 5,104,520 A | 4/1992 | Maronde et al. | |
| 5,120,436 A | 6/1992 | Reichner | |
| 5,193,688 A | 3/1993 | Giddings | |
| 5,314,529 A | 5/1994 | Tilton et al. | |
| 5,535,892 A * | 7/1996 | Moorhead et al. | 209/157 |
| 5,556,537 A | 9/1996 | Saarenketo | |
| 5,587,128 A | 12/1996 | Wilding et al. | |
| 5,632,957 A | 5/1997 | Heller et al. | |
| 5,653,859 A | 8/1997 | Parton et al. | |
| 5,690,763 A * | 11/1997 | Ashmead et al. | 156/60 |
| 5,715,946 A | 2/1998 | Reichenbach | |
| 5,728,262 A | 3/1998 | Moss et al. | |
| 5,958,240 A | 9/1999 | Hoel | |
| 5,971,158 A | 10/1999 | Yager et al. | |
| 5,993,668 A | 11/1999 | Duan | |
| 6,013,165 A | 1/2000 | Wiktorowicz et al. | |
| 6,087,608 A | 7/2000 | Schlichter et al. | |
| 6,100,535 A | 8/2000 | Mathies et al. | |
| 6,272,296 B1 | 8/2001 | Gartstein | |
| 6,355,491 B1 | 3/2002 | Zhou et al. | |
| 6,422,735 B1 | 7/2002 | Lang | |
| 6,454,945 B1 | 9/2002 | Weigl et al. | |
| 6,527,125 B2 * | 3/2003 | Niitti | 209/498 |
| 6,569,323 B1 | 5/2003 | Pribytkov | |
| 6,827,911 B1 | 12/2004 | Gering | |
| 6,905,029 B2 | 6/2005 | Flagan | |
| 7,104,405 B2 * | 9/2006 | Bohm et al. | 209/631 |
| 7,156,970 B2 | 1/2007 | Lean et al. | |
| 7,163,611 B2 | 1/2007 | Volkel et al. | |
| 7,226,542 B2 | 6/2007 | Zemel et al. | |
| 7,241,423 B2 * | 7/2007 | Golbig et al. | 422/130 |
| 7,282,129 B2 | 10/2007 | Lean et al. | |
| 7,431,228 B2 | 10/2008 | Bohm et al. | |
| 7,491,307 B2 | 2/2009 | Hsieh et al. | |
| 7,497,334 B2 | 3/2009 | Tyvoll et al. | |
| 7,534,336 B2 | 5/2009 | Volkel et al. | |
| 7,584,857 B2 | 9/2009 | Bohm et al. | |
| 7,770,738 B2 | 8/2010 | Tabata et al. | |
| 8,813,971 B2 * | 8/2014 | Cooke et al. | 209/459 |
| 8,875,903 B2 * | 11/2014 | Lean et al. | 209/728 |
| 8,931,644 B2 * | 1/2015 | Lean et al. | 209/726 |
| 2002/0130068 A1 | 9/2002 | Fassbender et al. | |
| 2004/0038249 A1 | 2/2004 | Darteil et al. | |
| 2005/0183996 A1 | 8/2005 | Zemel et al. | |
| 2006/0087918 A1 | 4/2006 | Ji et al. | |
| 2006/0118479 A1 | 6/2006 | Shevkoplyas et al. | |
| 2006/0158640 A1 | 7/2006 | Molter et al. | |
| 2006/0240964 A1 | 10/2006 | Lolachi et al. | |
| 2008/0028940 A1 | 2/2008 | Han et al. | |
| 2008/0128331 A1 | 6/2008 | Lean et al. | |
| 2009/0014360 A1 | 1/2009 | Toner et al. | |
| 2009/0050538 A1 | 2/2009 | Lean et al. | |
| 2009/0114601 A1 | 5/2009 | Lean et al. | |
| 2009/0114607 A1 | 5/2009 | Lean et al. | |
| 2009/0283452 A1 | 11/2009 | Lean et al. | |
| 2012/0152855 A1 * | 6/2012 | Lean et al. | 210/747.5 |
| 2014/0367349 A1 * | 12/2014 | Volkel et al. | 210/789 |

FOREIGN PATENT DOCUMENTS

| | | |
|---|---|---|
| DE | 28 09 630 A1 | 9/1978 |
| DE | 2829592 A1 | 1/1980 |
| DE | 2929139 | 1/1981 |
| DE | 3736504 | 3/1989 |
| DE | 4200802 | 7/1993 |
| DE | 19855256 A1 | 6/2000 |
| DE | 10001737 | 10/2001 |
| DE | 102004039182 | 2/2006 |
| EP | 0448973 | 10/1991 |
| EP | 1407807 A1 | 4/2004 |
| EP | 1681549 | 7/2006 |
| EP | 1795894 | 6/2007 |
| EP | 2 060 312 A2 | 5/2009 |
| FR | 2571354 | 4/1986 |
| FR | 2753392 A1 | 3/1998 |
| GB | 330163 A | 6/1930 |
| GB | 386080 A | 1/1933 |
| GB | 934423 | 8/1963 |
| GB | 1039485 | 8/1966 |
| GB | 2012193 | 7/1979 |
| GB | 2024038 | 1/1980 |
| GB | 2 098 091 A | 11/1982 |
| GB | 2209969 | 6/1989 |
| JP | 60071083 | 4/1985 |
| JP | 63319017 | 12/1988 |
| JP | 5007795 A | 1/1993 |
| JP | 08-238457 | 9/1996 |
| JP | 2001-025685 A | 1/2001 |
| JP | 2001-064789 | 3/2001 |
| JP | 2001121039 | 8/2001 |
| JP | 2004-330008 A | 11/2004 |
| JP | 2007069179 | 3/2007 |
| JP | 9299712 | 11/2007 |
| JP | 2008-036621 A | 2/2008 |
| JP | 045049795 B2 | 7/2010 |
| KR | 20030003206 | 1/2003 |
| WO | WO 86/03140 A1 | 6/1986 |
| WO | WO8810239 | 12/1988 |
| WO | WO9838134 | 9/1998 |
| WO | WO2004113877 | 12/2004 |
| WO | WO2006056219 | 6/2006 |

OTHER PUBLICATIONS

Singapore Search Report prepared by Danish PTO, App #200902858-0, Nov. 4, 2009.

Thiruvenkatachari et al., "Flocculation-cross-flow microfiltration hybrid system for natural organic matter (NOM) removal using hematite as a flocculent," Desalination, Elsevier, Amsterdam, NL, vol. 147, No. 1-3, XP 004386413, pp. 83-88, Sep. 10, 2002.

Yang et al., "Particle Separation in Microfluidic Channels Using Flow Rate Control," Proceedings of IMECE2004-60862, pp. 1-6, Anaheim, CA, Nov. 13-19, 2004.

Takagi et al., "Continuous Particle Separation in a Microchannel having Asymmetrically Arranged Multiple Branches,", Lab on a Chip 2005, Lab Chip, 2005, 5, pp. 778-784, May 19, 2005.

Zhang et al., "Continuous Flow Separation of Particles Within an Asymmetric Microfluidic Device," Lab on a Chip 2006, Lab Chip, 2006, 6, pp. 561-566, Mar. 13, 2006.

Narayanan et al., "A Microfabricated Electrical SPLITT System," Lab on a Chip 2006, Lab Chip, 2006, 6, pp. 105-114, Dec. 5, 2005.

Kapishnikov et al., "Continuous Particle Size Separation and Size Sorting Using Ultrasound in a Microchannel," Journal of Statistical Mechanics: Theory and Experiment, P01012, pp. 1-15, 2006.

Brenner, "Polymer Fabrication and Microfluidic Unit Operations for Medical Diagnostics on a Rotating Disk," Dissertation at Institute of Microsystems, University of Frieburg, Dec. 2005.

Ookawara et al., "Feasibility Study on Concentration of Slurry and Classification of Contained Particles by Microchannel," Chemical Engineering Journal, v. 101, pp. 171-178, 2004.

(56) References Cited

OTHER PUBLICATIONS

Matthews et al., "Particle Flow Modelling on Spiral Concentrators: Benefits of Dense Media for Coal Processing?," Second International Conference on CFD in the Minerals and Process Industries, CSIRO, Melbourne, Australia, pp. 211-216, Dec. 6-8, 1999.
Shi et al., "Radial Capillary Array Electrophoresis Microplate and Scanner for High-Performance Nucleic Acid Analysis," Analytical Chemistry, vol. 71, No. 23, pp. 5354-5361, Dec. 1, 1999.
Chiu et al., "High Radial Acceleration in MicroVortices", Nature, vol. 425, Sep. 4, 2003.
Tuval et al., "Neutrally Buoyant Particles and Bailout Embeddings in Three-Dimensional Flows," 5th International Summer School/Conference Proceedings, Let's Face Chaos Through Nonlinear Dynamics (online), Jun. 30-Jul. 14, 2002, Jul. 2002 (retrieved on Jan. 21, 2009). Retrieved from the Internet: http://www.camtp.uni-mb.si/chaos/2002/reports/abstracts.shtml.
Gascoyne et al., "Particle Separation by Dielectrophoresis," Electrophoresis 2002, 23, pp. 1973-1983, Houston, Texas, 2002.
Bennett et al., "Combined Field-Induces Dielectrophoresis and Phase Separation for Manipulating Particles in Microfluidics," American Institute of Physics, vol. 82, No. 23, pp. 4866-4868, Dec. 8, 2003.
Inglis et al., "Continuous Microfluidic Immunomagnetic Cell Separation," American Institute of Physics, vol. 85, No. 21, pp. 5093-5095, Nov. 22, 2004.
Giddings, "Field-Flow Fractionation: Analysis of Macromolecular, Colloidal, and Particulate Materials," Science, vol. 260, pp. 1456-1465, Jun. 4, 1993.
Reschiglian et al., "Field-Flow Fractionation and Biotechnology," TRENDS in Biotechnology, vol. 23, No. 9, pp. 475-483, Sep. 9, 2005.
Segré et al., "Radial Particle Displacements in Poiseuille Flow of Suspensions," Nature Publishing Group, No. 4760, pp. 209-210, Jan. 21, 1961.
Segré et al., "Behaviour of Macroscopic Rigid Spheres in Poiseuille. Flow Part 2. Experimental Results and Interpretation," Weizmann Institute of Schence, Rehovoth, Israel, pp. 136-157, received Nov. 6, 1961 and in revised form Mar. 16, 1962.
Leighton et al., "The Lift on a Small Sphere Touching a Plane in the Presence of a Simple Shear Flow," Journal of Applied Mathematice and Physics (ZAMP), vol. 36, pp. 174-178, Jan. 1985.
Cherukat et al., "The Inertial Lift on a Rigid Sphere in a Linear Shear Flow Field Near a Flat Wall," J. Fluid Mech. 1994, vol. 263, pp. 1-18, Received Mar. 8, 1993 and in revised form Aug. 18, 1993.
Saffman, "The Loft on a Small Sphere in a Slow Shear Flow," J. Fluid Mech. 1965, vol. 22, Part 2, pp. 385-400, Received Oct. 29, 1964.
Rubinow et al., "The Transverse Force on a Spinning Sphere Moving in a Viscous Fluid," Institute of Mathematical Sciences, New York University, New York, pp. 447-459, Mar. 13, 1961.
Ho et al., "Inertial Migration of Rigid Spheres in two-Dimensional Unidirectional Flows," J. Fluid Mech. 1974, vol. 65, Part 2, pp. 365-400, Received Sep. 4, 1973.
Vasseur et al., "The Lateral Migration of a Spherical Particle in Two-Dimensional Shear Flows," J. Fluid Mech. 1976, vol. 78, Part 2, pp. 385-413, Received Dec. 4, 1975.
Feng et al., "Direct Simulation of Initial Value Problems for the Motion of Solid Bodies in a Newtonian Fluid. Part 2., Couette and Poiseuille Flows," J. Fluid Mech. 1994, vol. 277, pp. 271-301, Received Sep. 20, 1993 and in revised form May 11, 1994.
Asmolov, "The Inertial Lift on a Spherical Particle in a Plane Poiseuille Flow at Large Channel Reynolds Number," J. Fluid Mech. 1999, vol. 381, pp. 63-87, Received Feb. 28, 1997 and in revised form Sep. 10, 1998.
Asmolov, "The Inertial Lift on a Small Particle in a Weak-Shear Parabolic Flow," American Institute of Physics, vol. 14, No. 1, Jan. 2002.
Matas et al., "Inertial Migration of Rigid Spherical Particles in Poiseuille Flow," J. Fluid Mech. 2004, vol. 515, pp. 171-195, Received Apr. 17, 2003 and in revised form Apr. 19, 2004).
Yang et al., "Migration of a Sphere in Tube Flow," J. Fluid Mech. 2005, vol. 540, pp. 109-131, Received Mar. 30, 2004 and in revised form Apr. 13, 2005.
Michaelides, Hydrodynamic Force and Heat/Mass Transfer From Particles, Bubbles, and Drops—The Freeman Scholar Lecture, Journal of Fluids Engineering, vol. 125, pp. 209-238, Mar. 2003.
Cherukat et al., "Wall-Induced Lift on a Sphere," Int. J. Multiphase Flow, vol. 16, No. 5, 1990, pp. 899-907, Received Nov. 6, 1989 and in revised form Apr. 1, 1990).
Cherukat et al., "The Inertial Lift on a Rigid sphere Translating in a Linear Shear Flow Field," Int. J. Multiphase Flow, vol. 20, No. 2, 1994, pp. 339-353, Received Feb. 20, 1993 and in revised form Oct. 10, 1993.
Berger et al., "Flow in Curved Pipes," Ann. Rev. Fluid Mech. 1983, vol. 15, pp. 461-512, 1983.
Gupalo et al., "Velocity Field of a Liquid Stream in a Spiral Channel of Rectangular Cross Section," pp. 109-112. Translated from Izvestiya Adademii Nauk SSSR, Mekhanika Zhidkosti I Gaza, No. 1, pp. 131-136, Jan.-Feb. 1977. Original article submitted Jan. 8, 1976.
Dean, "Fluid Motion in a Curved Channel," Imperial College of Science, pp. 402-420, Jul. 31, 1928.
Sudarsan et al., "Multivortex Micromixing," PNAS, vol. 103, No. 19, pp. 7228-7233, May 9, 2006.
Xia et al., "Soft Lithography," Annu. Rev. Mater. Sci. 1998, vol. 28, pp. 153-184, 1998.
Sao et al., "Integrated Multiple Patch-Clamp Array Chip Via Lateral Cell Trapping Junctions," American Institute of Physics, vol. 84, No. 11, pp. 1973-1975, Mar. 15, 2004.
Ookawara et al., A Numerical Study of the Influence of Particle Density on Lift Force-Induced Separation in a Micro-Separator/Classifier by a Macroscopic Particle Model, Journal of Chemical Engineering of Japan, vol. 40, No. 11, pp. 986-992, 2007.
Ookawara et al., "Quasi-direct numerical simulation of life force-induced particle separation in a curved microchannel by use of a macroscopic particle model," Chemical Engineering Science 62, pp. 2454-2465, 2007.
Ookawara et al., "Applicability of a Miniaturized Micro-Separator/Classifier to Oil-Water Separation," Chem. Eng. Technol., 30, No. 3, pp. 316-321, 2007.
Ookawara et al., "Numerical study on development of particle concentration profiles in a curved microchannel," Chemical Engineering Science, 61, pp. 3714-3724, 2006.
Ookawara et al., "A numerical study on a macroscopic Stokes number based on shear-induced interparticle collisions in a micro-separator/classifier," Chemical Engineering Journal 135S, pp. S21-S29, 2008.

* cited by examiner

FLUIDIC STRUCTURES FOR MEMBRANELESS PARTICLE SEPARATION

CROSS REFERENCE TO RELATED PATENTS AND APPLICATIONS

This application is related to co-pending, commonly assigned U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,153, filed on even date herewith, entitled "A Method and Apparatus for Splitting Fluid Flow in a Membraneless Particle Separation System," and naming Lean et al. as inventors.

BACKGROUND

Several different types of membraneless particle separation devices having a generally spiral or curved configuration have been described in U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,153, filed on even date herewith, entitled "A Method and Apparatus for Splitting Fluid Flow in a Membraneless Particle Separation System," and naming Lean et al. as inventors.

In general, such devices are useful in connection with particles having density differences compared with water, thus creating centrifugal or buoyancy forces necessary for transverse migration through the channel for purposes of separation. Some of these devices are also useful, depending on their configuration, to separate neutrally buoyant particles.

With reference to FIG. 1, one example form of a separation device 20 is shown. This form shows an expanding spiral channel 22 with increasing radius of curvature. This geometry takes advantage of the rate of pressure change. Other configurations may also be used. In another form, the device may have a contracting spiral channel with a decreasing radius of curvature for the sidewalls. The radius of curvature and channel size may also be held substantially constant. In any case, the channel 22 evolves into two separate channels 24 and 26 (e.g. also referred to as channel #1 and channel #2 in FIG. 1) to provide two outlet paths for the fluid.

These types of separation devices provide for particle separation in a variety of manners. For example, depending on the flow rate, the particle separation may be driven by the centrifugal force or the pressure that is created by flow fluid through the channel. In any event, it is the objective of such devices to achieve particle separation. In this regard, homogeneously distributed particles at the inlet are separated into a band, or populated in a portion of the fluid stream, and diverted at the outlet into a first portion or band including selected particulates and a second portion without such particulates resident therein. Co-pending, commonly assigned U.S. patent application Ser. No. 12/120,153, filed May 13, 2008, entitled "A Method and Apparatus for Splitting Fluid Flow in a Membraneless Particle Separation System," and naming Lean et al. as inventors, describes a variety of mechanisms and subsystems to enhance the splitting of the fluid flow at the outlet to provide enhancement for at least two outlet paths for the fluid.

Designs and implementations of these types of devices for different environments and incorporating selected improvements are desired.

INCORPORATION BY REFERENCE

This application is related to co-pending, commonly assigned U.S. patent application Ser. No. 11/606,460, filed Nov. 30, 2006, entitled "Particle Separation and Concentration System," U.S. patent application Ser. No. 11/936,729, filed Nov. 7, 2007, entitled "Fluidic Device and Method for Separation of Neutrally Buoyant Particles," U.S. application Ser. No. 11/936,753, filed Nov. 7, 2007, entitled "Device and Method for Dynamic Processing in Water Purification," and co-pending, commonly assigned U.S. patent application Ser. No. 12/120,153, filed May 13, 2008, entitled "A Method and Apparatus for Splitting Fluid Flow in a Membraneless Particle Separation System," and naming Lean et al. as inventors, all of which are incorporated herein by this reference in their entirety.

BRIEF DESCRIPTION

In one aspect of the presently described embodiments, the system comprises a plurality of individual curved particle separation devices stacked such that the devices are parallel to one another and an inlet coupler connected to all inlets of the devices, the inlet couple being operative to facilitate input of fluid to all inlets of the plurality of individual curved particle separation devices.

In another aspect of the presently described embodiments, the curved particle separation devices are spiral devices.

In another aspect of the presently described embodiments, the curved particle separation devices comprise curved portions that span between 180 degrees and 360 degrees of angular distance along a diameter thereof.

In another aspect of the presently described embodiments, the system further comprises a feedback control system.

In another aspect of the presently described embodiments, the feedback control system is operative to control the system based on at least one of pressure, flow rate, bandwidth, viscosity, and temperature.

In another aspect of the presently described embodiments, the system further comprises at least a second plurality of stacked curved particle separation devices arranged in parallel with the plurality of stacked curved particle separation devices.

In another aspect of the presently described embodiments, the system comprises an inlet manifold, a plurality of separation channels facilitating fluid flow therein and arranged in a helical spiral configuration wherein the channels are parallel to one another and an output manifold.

In another aspect of the presently described embodiments, the output manifold includes a portion therein operative to split the fluid flow from each of the channels.

In another aspect of the presently described embodiments, the portion is a static collar portion.

In another aspect of the presently described embodiments, the portion is a substantially circular collar portion.

In another aspect of the presently described embodiments, the portion is comprised of curves to provide a continuously adjustable split of the fluid flow.

In another aspect of the presently described embodiments, the portion is comprised of discrete step segments to provide a step-wise adjustable split of the fluid flow.

In another aspect of the presently described embodiments, the plurality of separation channels is arranged in a first stage and a second stage.

In another aspect of the presently described embodiments, the first stage and second stage are separated by a fluid inverter.

In another aspect of the presently described embodiments, the system further comprises a feedback control system.

In another aspect of the presently described embodiments, the feedback control system is operative to control the system based on at least one of pressure, flow rate, bandwidth, viscosity, and temperature.

In another aspect of the presently described embodiments, the system further comprises an inlet main and an outlet main.

In another aspect of the presently described embodiments, the system further comprises a second device connected to the inlet and outlet mains.

DETAILED DESCRIPTION

The presently described embodiments relate to various fluidic structures, implementations and selected fabrication techniques to realize construction of fluidic separation structures that are of a stacked and/or parallel configuration These contemplated systems provide for efficient input of fluid to be processed, improved throughput, and, in some variations, adjustable and efficient treatment of output fluid.

It will be understood that variations of these devices may be realized based on dimensional scale and channel architecture. However, it is contemplated that the embodiments described herein will be highly scalable to span microscale (0 to 10 mL/min), miniscale (10-1000 mL/min), and macroscale (1-10 L/min) single-channel flow rates.

Planar embodiments utilizing convenient stacking techniques are contemplated. In this regard, circular arcs (that do not complete a spiral) in the range of 180 to 360 degrees allow for sequential stages of transverse flow pattern development, attainment of steady state flow velocity and time for several circulatory passes to sweep particles to a desired position in the fluid flow. Other planar embodiments described herein include helical spirals.

The presently contemplated embodiments may be fabricated from inexpensive materials such as PDMS for microscale, inexpensive plastics (such as acrylic, Lucite and polycarbonate) for miniscale and macroscale applications. Selected fabrication techniques for some of these embodiments are also described.

In addition, a parallel eight channel helical spiral embodiment provides for quick assembly and disassembly. Notable features of such a contemplated device include convenient inlet manifolds and outlet manifolds that include a bifurcating mechanism or splitter to split the fluid into particulate and effluent fluid streams. The contemplated embodiments also allow for a multiple stage device operative to output an extremely narrow band of particulates for further disposal or processing. Other parallel configuration embodiments and fabrication techniques therefor are contemplated. Also, a feedback and/or control system may be implemented with any of the presently described embodiments.

Figure 1:
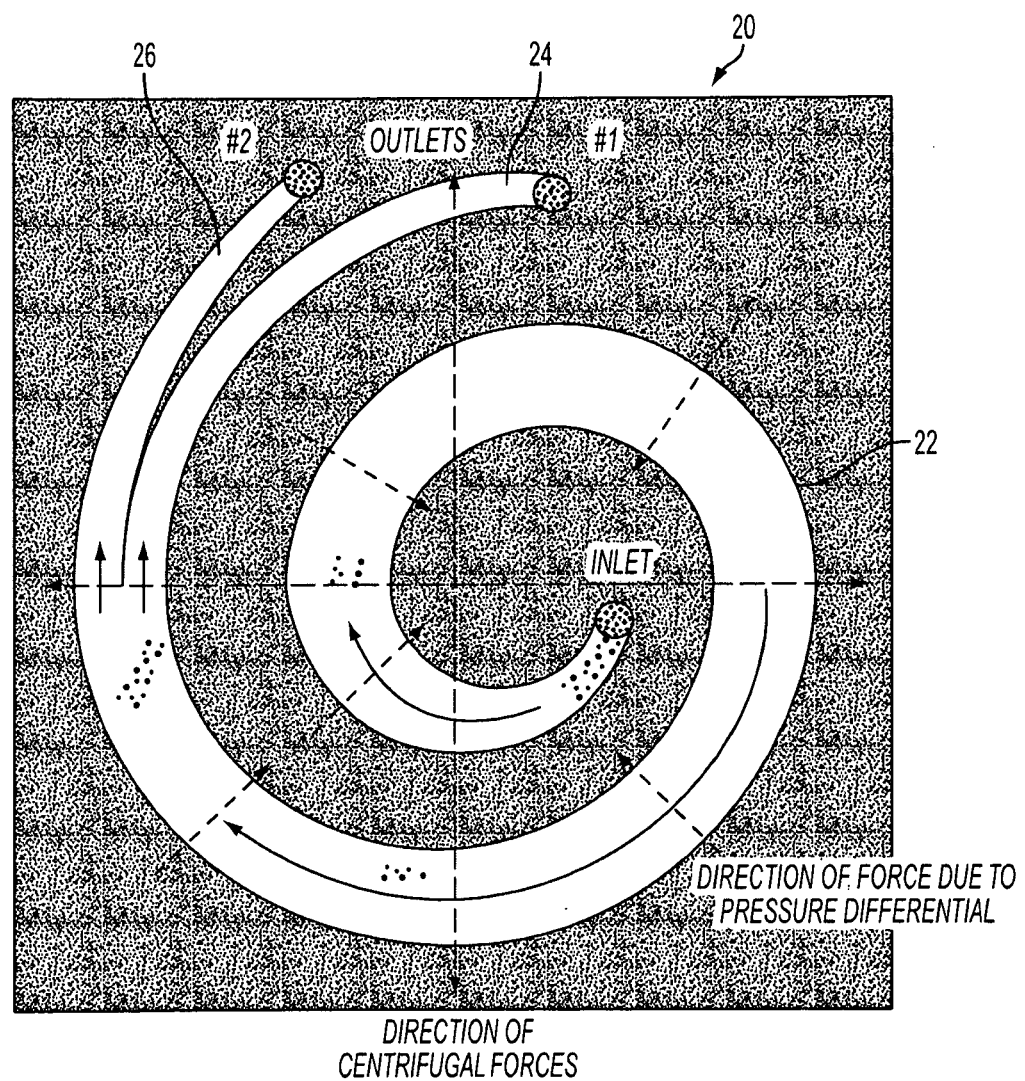
FIG. 1 is a representation of an example spiral particle separation device.
Figure 2:
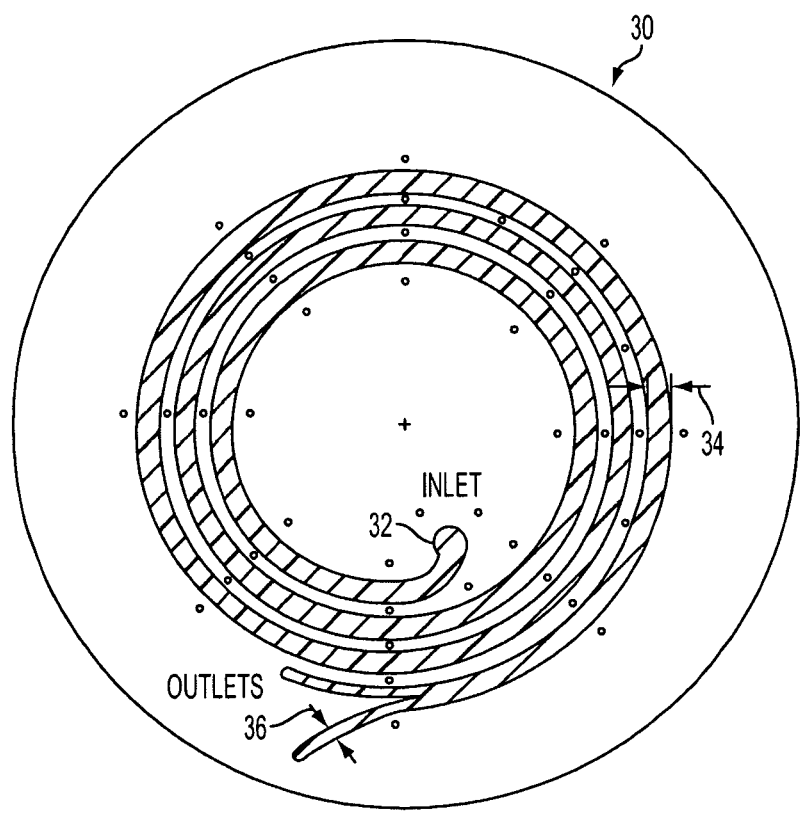
FIG. 2 illustrates a form of the presently described embodiments.

With reference now to FIG. 2, a single planar spiral separation device 30 is illustrated. The device 30 has an inlet 32, at least one curved or spiral portion 34 and an outlet 36. This planar multi-spiral channel device 30, in one form, may be cut from plastic. The type of plastic may vary as a function of the specific application and the environment in which it is implemented. In one variation of the device 30, the center region of the device 30 near the inlet 32 may be removed to allow access for an inlet coupler to be described hereafter. The spirals portion 34 of the device may take a variety of forms. For example, the spiral portion 34 may be converging or diverging. As a further example, the outlet 36 and inlet 32 locations may be interchanged to suit the application, e.g. for increasing or decreasing centrifugal forces.

It should be appreciated that the fundamental operation of individual curved or spiral separation devices to separate particles in fluid, such as device 30 or other devices contemplated herein, is described in detail in selected portions of the above referenced patent applications (which are incorporated herein by reference). Therefore, such operation will not be described herein except to the extent that such description will enhance the description of the presently described embodiments.

Figure 3:
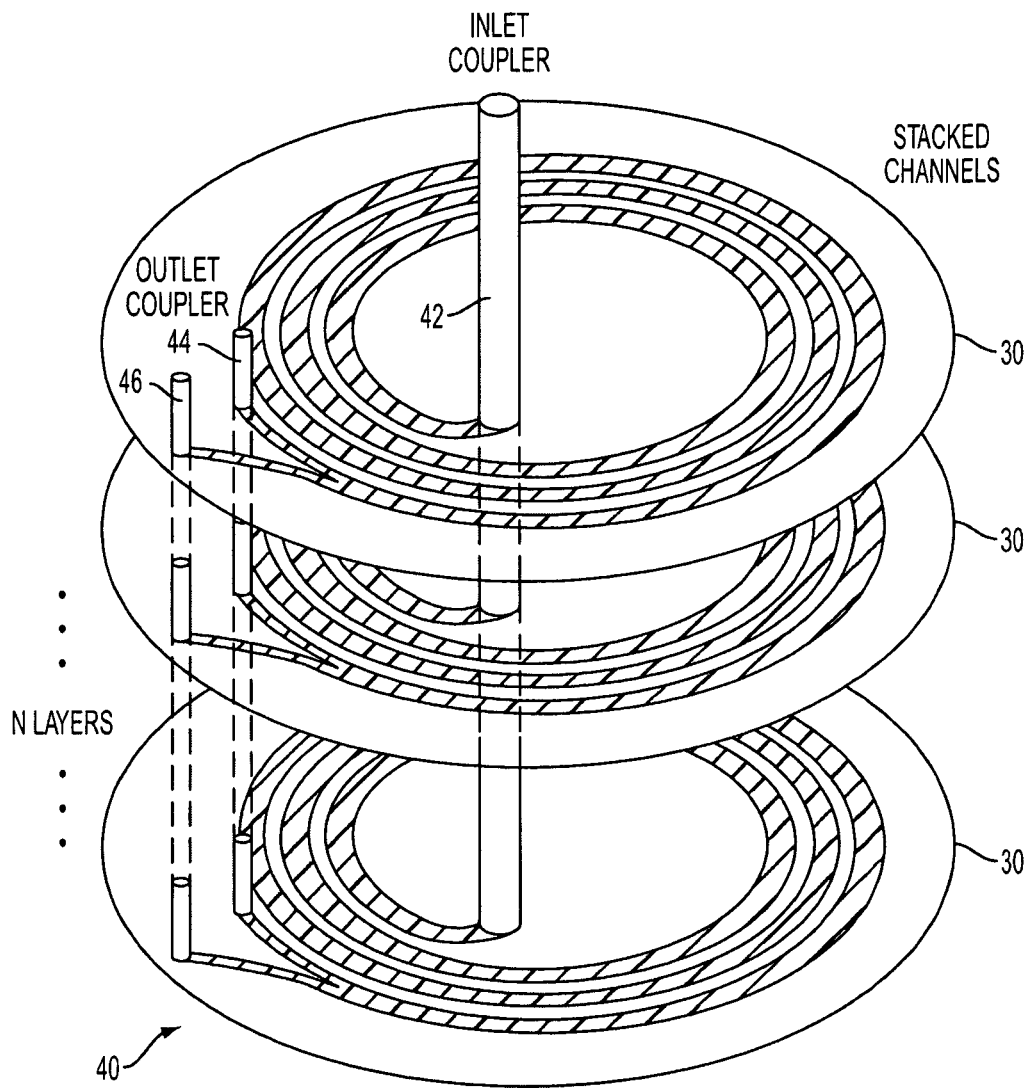
FIG. 3 illustrates a form of the presently described embodiments.

With reference to FIG. 3, a system 40 is representatively shown and comprises a plurality of devices 30 (shown in FIG. 2) stacked in a parallel manner to allow for N-layers of parallel processing of fluid. Also representatively shown in FIG. 3 is an inlet coupler 42—which allows for input fluid to be provided to each device 30 within the entire stack from a common supply source. The inlet coupler 42 may take a variety of forms; however, in one example, the inlet coupler 42 is cylindrical and has perforations formed therein. The perforations correspond to inlets of the devices 30 stacked in the system 40. Outlet couplers of a similar configuration may also be implemented. Two outlet couplers 44 and 46 are representatively shown here, although the number of outlet couplers could vary based on the number of outlet paths or channels for each stacked device. The inlet coupler may be joined only with the top channel through an external Al plate, for example. Fluidic connection to all layers may be achieved by punching through all the top layers except for the bottom. At least two fluidic outlets, or outlet couplers such as those shown at 44 and 46, may be connected in the same manner on the top plate. All inlet and outlets connections may also be implemented on the bottom plate.

Figure 4:
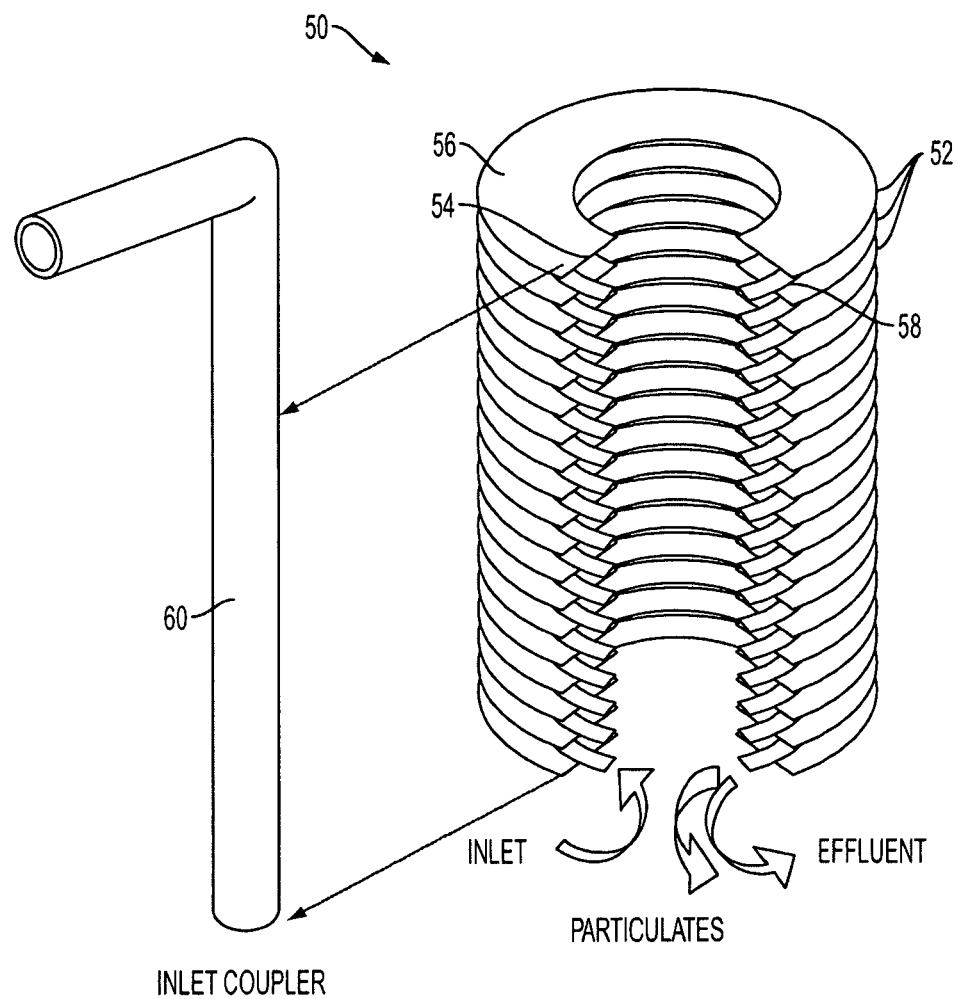
FIG. 4 illustrates a form of the presently described embodiments.

With reference to FIG. 4, a system 50 comprises multiple planar curved arc segments 52 (e.g. fractional arc segments) that are vertically stacked as parallel channels to increase throughput. These planar curved arc segments do not complete a loop for any one segment 52, although the characteristics and functions of a spiral device will nonetheless apply to these segments 52 in this case. The arc segments or curved portions 52 comprise an inlet 54, curved or arc section 56 and an outlet 58. Also shown in FIG. 4 is an inlet coupler 60 that, again, allows for an inlet of fluid from a common source to all of the separate arc segments shown. It should be appreciated that the inlet coupler may take a variety of forms. In one form, the inlet coupler is a cylinder and has perforations or a continuous slot corresponding to the inlet of each layer. Like the system 40 of FIG. 3, the system 50 provides for increased throughput for fluid particle separation. At least one outlet coupler (not shown) may also be implemented. The outlet coupler(s) could resemble the inlet coupler of FIG. 3 or 4, for example.

Figure 5:
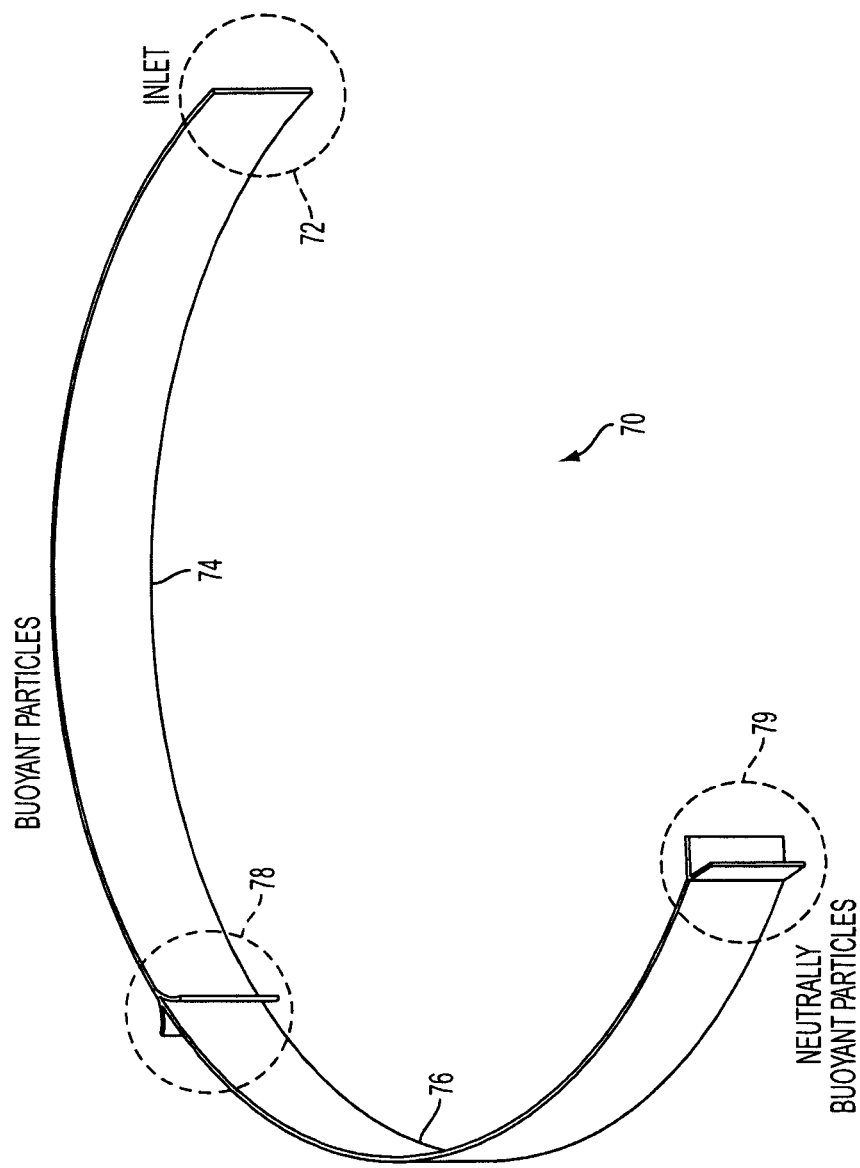
FIG. 5 illustrates a form of the presently described embodiments.

With reference to FIG. 5, another planar curved structure 70 comprising stacked channels (not shown individually) is shown. The curved structure 70 has an inlet 72 (which may include an inlet coupler), curved portions 74 and 76, and at least one outlet 78 or 79. As shown, there is an outlet 78 for selected particles such as particles of a particular size or density (e.g. buoyant particles). The outlet 78 is positioned midway around the curve between the curved portion 74 and curved portion 76. A second outlet 79 for selected particles of a second size or density (e.g. neutrally buoyant particles) is positioned at an end of the curve opposite the inlet 72. In general, these outlets 78 and 79 can be used to remove particles of varying sizes or densities from the fluid flow. As above, at least one outlet coupler may also be utilized.

Figure 6:
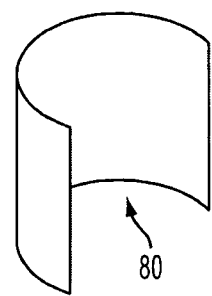
FIG. 6 illustrates a form of the presently described embodiments.

With reference to FIG. 6, a system 80 is shown. The system 80 comprises a plurality of devices 70, as shown in FIG. 5, that are stacked in a configuration to allow for increased throughput by way of parallel processing. It should be appreciated that the system 80 may also comprise a single device 70 of increased width. Of course, as above, an inlet coupler and/or at least one outlet coupler may be implemented in the system.

Figure 7:
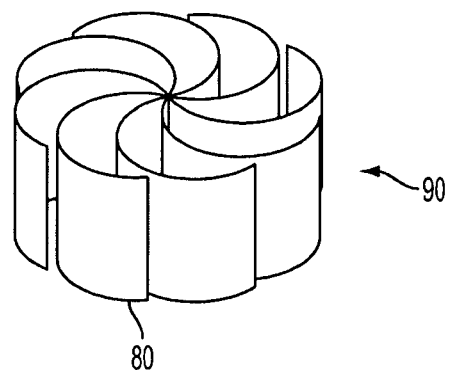
FIG. 7 illustrates a form of the presently described embodiments.
Figure 8A:
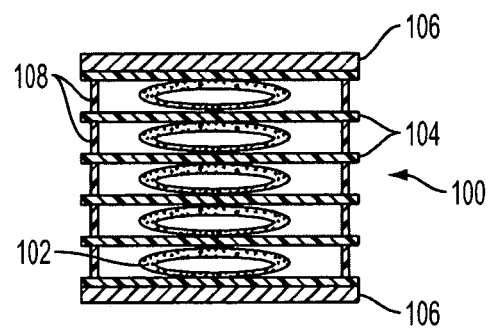
FIGS. 8(a)-8(d) illustrate a form of the presently described embodiments.
Figure 8B:
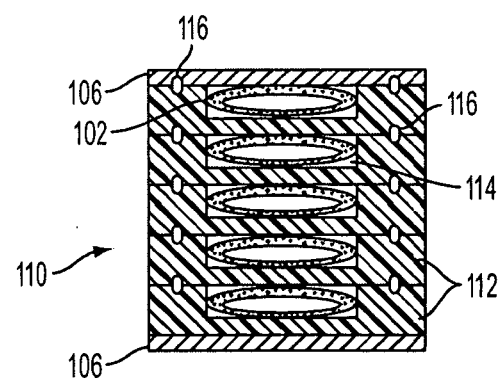
Figure 8C:
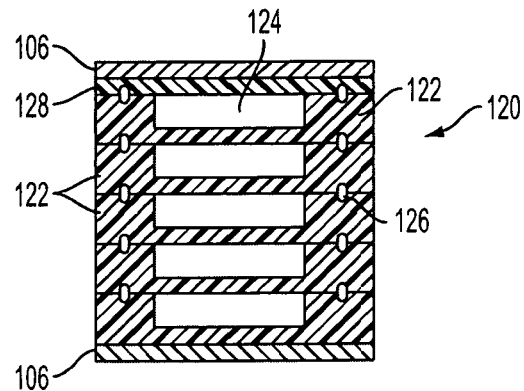
Figure 8D:
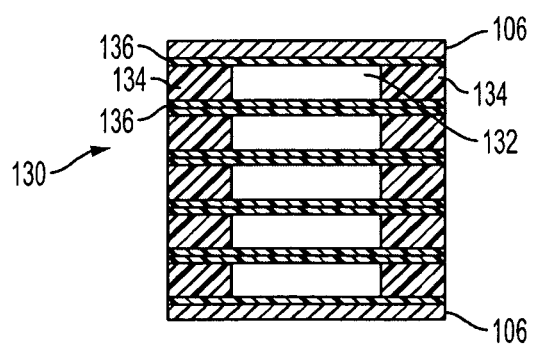

With reference to FIG. 7, a system 90 is illustrated. The system 90 represents a still further implementation of a plurality of systems 80 of FIG. 6. This design may be advantageous as a function of the space requirements of the system and/or environment into which the presently described embodiments are implemented. Notably, as shown, the inlet for all of the curved separation device sections is at the center of the configuration of system 90. This allows for efficient processing of the input fluid and may be realized by use of an inlet coupler, such as an inlet coupler 42 (FIG. 3) and inlet coupler 60 (FIG. 4). Again, an outlet coupler, or couplers, may also be implemented.

With reference to FIGS. 8(*a*)-8(*d*), it will be appreciated that the stacked and/or parallel embodiments of FIGS. 3, 4, 5, 6 and 7 may be fabricated using a variety of different techniques. FIGS. 8(*a*)-8(*d*) show various cross sections of different embodiments of the presently described embodiments. These figures also provide description of fabrication details that may be used to form the presently described embodiments.

With reference to FIG. 8(*a*), a cross-sectional view of a configuration 100 is illustrated. In this form, tubing 102 is disposed within chambers defined between endplates 106. The chambers are defined by plates 104 and spacers 108, as shown. In this configuration, the tubing 102 is controllably squeezed between the plates 104. To achieve the configuration 100, a variety of different assembly procedures may be used. Likewise, a variety of different materials may be used. However, in one form of the configuration of FIG. 8(*a*) (and in corresponding example elements of FIGS. 8(*b*)-(*d*)), the end plates 106 are formed of aluminum, the tubing 102 is formed of Tygon material, and the spacers 108 and plates 104 are formed of plastic, such as Plexiglas.

In FIG. 8(*b*), a similar structure 110 is provided except the tubing 102 is recessed within a cavity 114 formed in a plate 112 and stacked to increase throughput. The plates also are provided with alignment notches 116. Any suitable material may be used to form the plates 112, including a plastic material such as Plexiglas.

With reference to FIG. 8(*c*), a system 120 is illustrated wherein tubing 102 is eliminated. In this case, sufficiently sealed cavities 124 are formed in a substrate 122 and form the fluid channels which are stacked to increase throughput. Also shown is a cap layer 128 to seal the top cavity 124. Like FIG. 8(*b*), alignment notches 126 are also provided. The substrate 122 and cover plate 128 may be formed of any suitable material; however, in at least one form, these elements are formed of plastic material such as Plexiglas.

With reference to FIG. 8(*d*), a system 130 comprises spiral tracks 132 defined by wall portions 134 and plates 136. The wall portions 134 and the plates 136 may take a variety of forms. But, in one form, these structures are formed of plastic. Essentially, the structure 134 is formed and then laminated on both sides to form the enclosed channels 132. Again, these parallel devices are stacked for improved support and throughput. As with FIG. 8(*a*)-(*c*), both ends are supported by plates formed of, for example, aluminum.

Figure 9A:
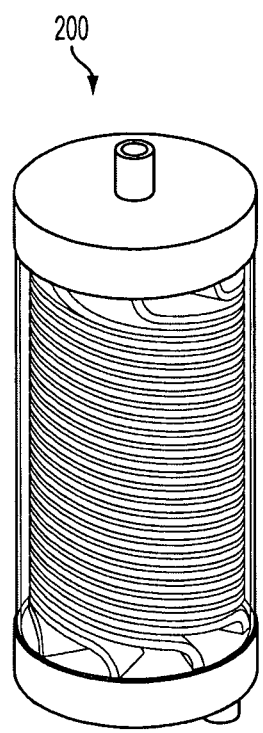
FIGS. 9(a)-9(b) illustrate a form of the presently described embodiments.
Figure 9B:
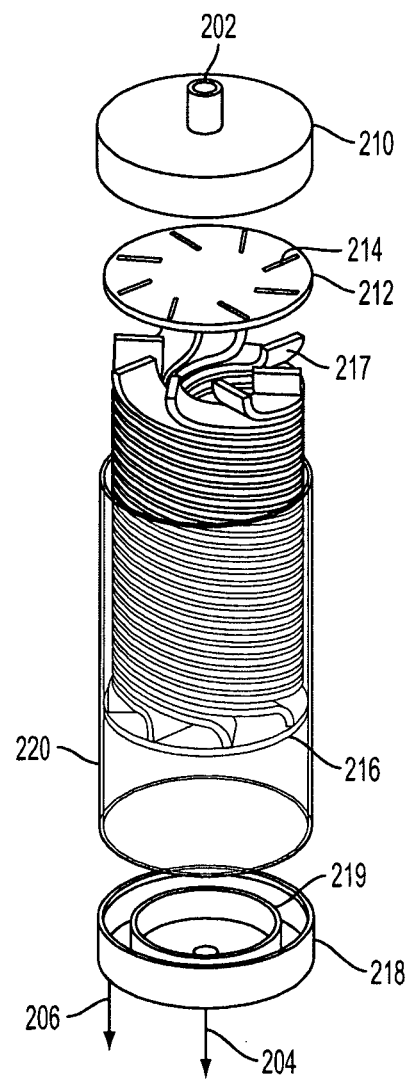

FIGS. 9(*a*)-(*b*) illustrate a further embodiment of the presently described embodiments. As shown in FIG. 9(*a*), a device 200 includes eight parallel channels in a helical spiral arrangement. This embodiment provides for quick assembly and disassembly, as shown in the exploded view of FIG. 9(*b*), the cross-sectional view of FIG. 10(*a*) and the end cap and manifold structure of FIG. 10(*b*).

In operation, fluid enters the device 200 through an inlet 202 and exits (separated) through outlet paths 204 and 206. An upper fluidic manifold 210 feeds the eight separate channels (such as channel 214) through the respective radially skewed slots on an end cap 212. A lower end cap 216 has slots corresponding to each channel as well as corresponding chutes 217. An outlet manifold 218 includes an inner ring 219 which acts as the bifurcator to spit the fluid into particulate and effluent streams.

The helical spiral structure formed by the channels, such as channel 214, fits within an external protective sleeve 220. It will be appreciated that, in one form, the device 200 is tightened by counter rotating the top and bottom manifold and end cap structures. Tightening pushes the helical spirals against each other, thus preventing distortions to the individual flow cross sections and, therefore, allowing the use of thinner and less expensive materials and a further reduction in space. Each individual channel may optionally have individual flow control at inlet or outlet to stop the flow.

Although design is somewhat self-cleaning as it operates at velocities in the range of 0.1 to 10 m/s, parallel channels allow for redundancy when clogging develops in a channel as the other channels will take up the slack to continue operation. Optionally, a flow sensor can be incorporated within a feedback loop to adjust the flow rate in order to maintain a constant separation velocity. Additionally, other inline devices such as flash mixers may be integrated with the top manifold. The eight channels are shown to illustrate parallelization, but any number of channels may be used.

Depending on the source water quality, i.e. particulate concentration and size distribution, the spiral separator will collect all of the particulates into a band of different widths. In order to allow optimization of the efficiency of the spiral concentrator in real time, it is desirable to have an adjustable stream splitter.

Figure 10A:
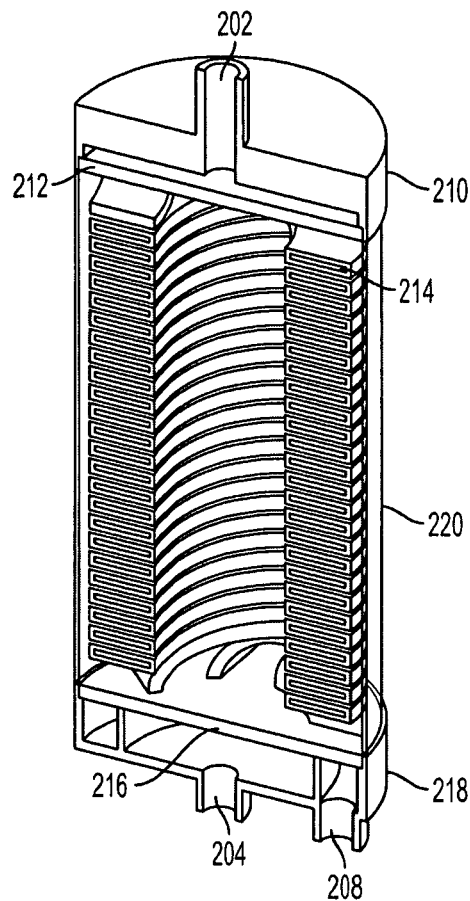
FIGS. 10(a) and 10(b) illustrate one form of the presently described embodiments.
Figure 10B:
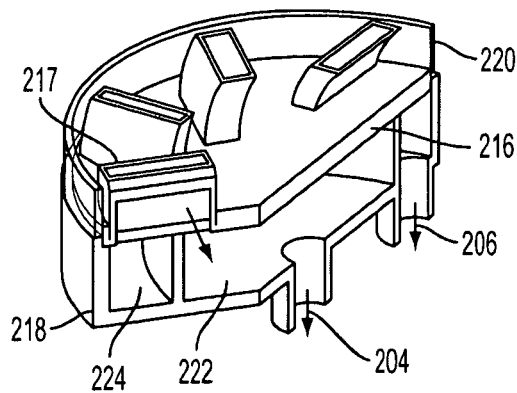

With reference now to FIGS. 10(a) and 10(b), an outlet manifold 218 having such a stream splitter is illustrated. The splitting mechanism can take a variety of forms as will be describe in connection with FIGS. 11 (a)-(c); however, in at least one form, the splitter will allow for the fluid to be split so that a portion 222 will exit the device on a first path as effluent and a portion 224 of the fluid will exit the device on a second path containing particles (e.g. a particle band).

The splitter is connected to the spiral separator device 200 such that it can be rotated on its central axis. For a device 200 with eight parallel channels, the splitter typically will rotate only about 45 degrees. The degree of radial change of the splitter wall can be optimized to the expected source water quality. For example, if the quality is expected to vary only slightly, a smaller change in radius is sufficient to capture the range of width change. If variations in water quality are larger, a larger change in radius may be necessary. When the adjustable splitter is operated manually, feedback from inline meters and other sensors may be used. Another manner of operating the splitter is to provide an automated feedback loop. In this way, optical sensors can be used at the exit portion of the channels to measure the bandwidth constantly and direct a server or motor to adjust the optimal splitter setting in real time. Similarly, flow sensors can also be used to monitor flow rate for feedback control of fluid velocity by adjusting pump speed and/or power.

Figure 11A:
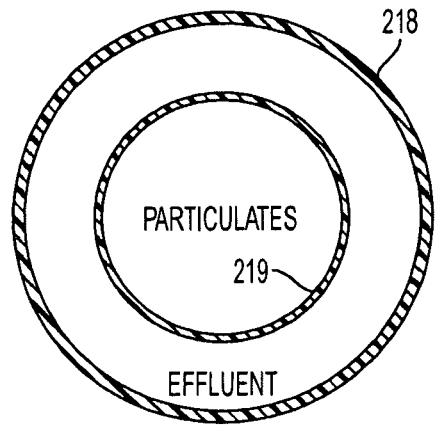
FIGS. 11(a)-11(c) illustrate a form of the presently described embodiments.
Figure 11B:
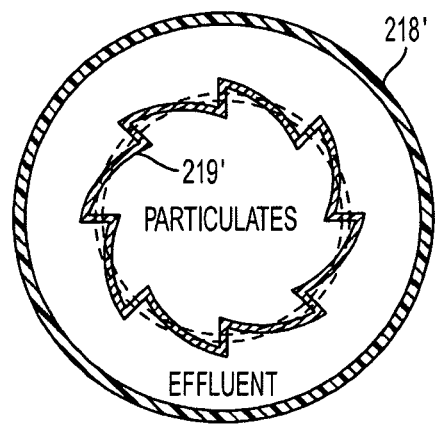
Figure 11C:
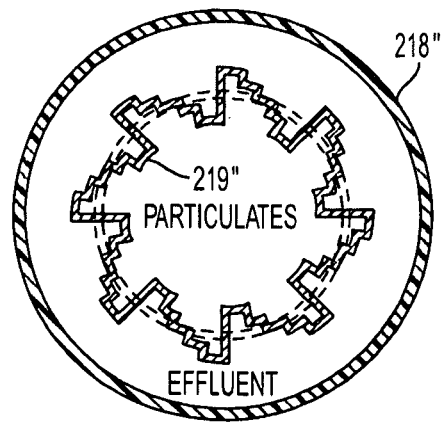

With reference to FIGS. 11(a)-11(c), various forms of the output fluid manifold are shown. FIG. 11(a) shows a static splitter. In this form, the manifold 218 is provided with a substantially circular collar device 219 to act as a splitter. Collar devices with pre-set splits of 20:80, 30:70, through 80:20 may be used interchangeably. FIG. 11(b) shows a continuously adjustable flow separator providing for non-linear control in custom curvature. In this form, the manifold 218' is provided with a portion 219' that includes strategically placed curved and straight portions to provide for the continuously adjustable flow. FIG. 11(c) shows a discrete stepwise adjustable flow separator design. In this form, the manifold 218" includes a portion 219" that is formed by discrete steps to provide discrete step-wise adjustable flow. In this form, the transition from one step to the next may be ratcheted.

The splitters, in any of these forms and others, are adjusted by turning the manifold of the device in a selected direction for a selected angular distance. This will move the splitting mechanism across the egress portion of the channel so that the split between the path 222 and the path 224 may be varied. Adjustments may be automated by a motor controlled by a computer.

Figure 12A:
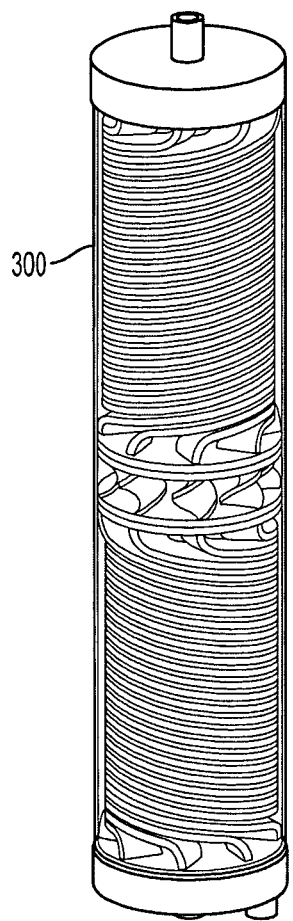
FIGS. 12(a)-12(c) illustrate a form of the presently described embodiments
Figure 12B:
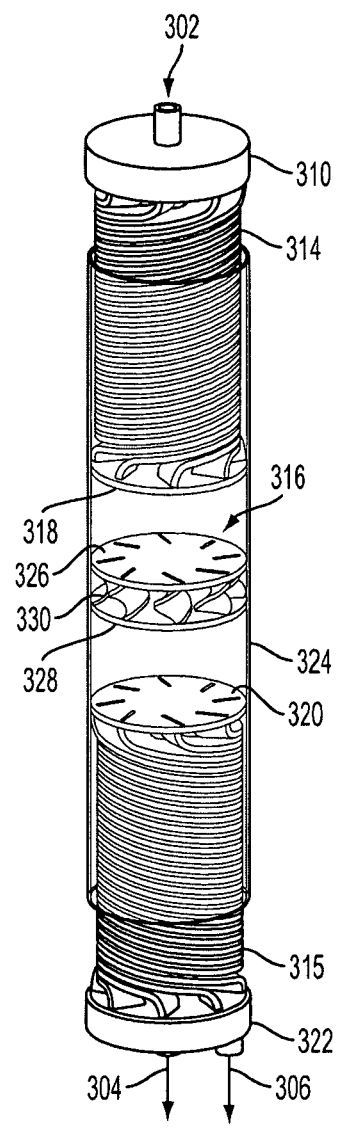

FIGS. 12(a) and (b) show an extension of the embodiment in FIGS. 9(a)-11(c) wherein a modular eight channel two stage helical spiral embodiment is illustrated. A fluid inverter 316 is provided in the embodiment shown. The fluid inverter is comprised of circular plates 326 and 328, having slots therein corresponding to the spiral channels. The fluid inverter also includes passageways 330 connecting corresponding slots in the plates 326 and 328. In the example embodiment shown in FIGS. 12(a) and 12(b), a fluid inversion is initiated in the fluid flow so that any resident particle band flips from one side of the channel to the other side of the channel to provide a compaction of particles. This achieves a narrower band. In FIG. 12(b), a first stage 314 is illustrated as well as a second spiral stage 315. To achieve the above noted flipping of the particle band, the spiral stage 315 is flipped upside down. The fluid inverter 316 is positioned between the stages.

Figure 12C:
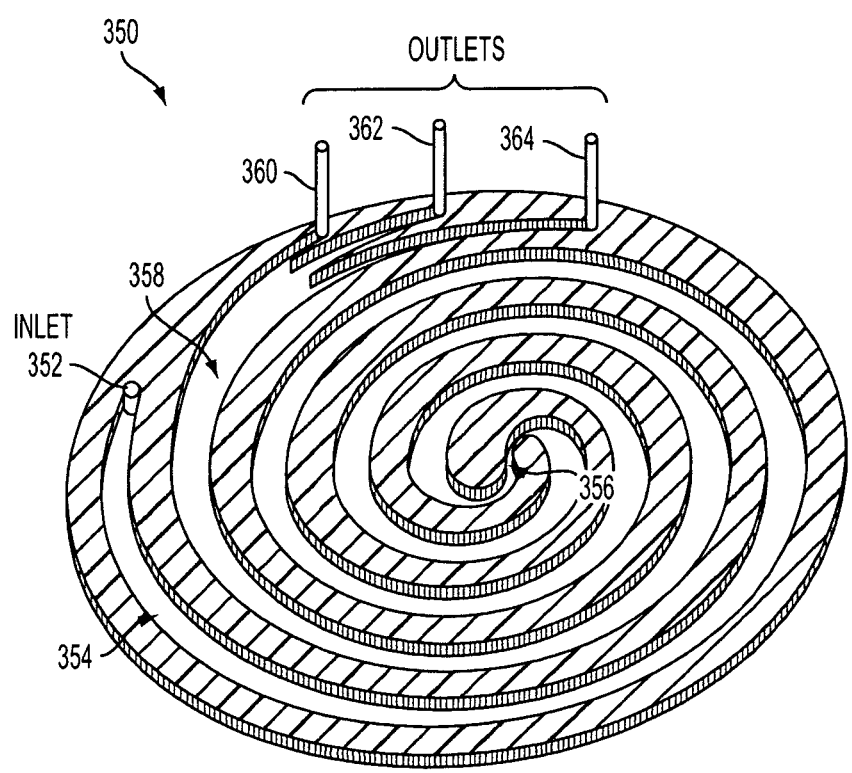

To further explain the principles of the inversion process, reference is made to FIG. 12(c). It will be appreciated that the embodiment of FIG. 12(c) differs in structure from the embodiment of FIGS. 12(a) and (b) in that the spiral device is of a different configuration and an inverter structure, such as inverter 316, is not shown. Nonetheless, it will be appreciated by those of skill in the art that the inversion principles as explained in connection with this drawing can be applied to the inversion process of the inverter 316. As shown, a spiral device 350 includes an inlet 352, a first curved portion or stage 354 of the spiral channel, a transition 356, a second curved portion or stage 358 and outlets 360, 362 and 364. In operation, the fluid is received at the inlet 352 and flows through the first stage 354—with particles being separated and, in some forms, being focused in a particle band, on one side of the channel. As the fluid passed through the abrupt transition point 356, the band (or separated particles) flips to the opposite side of the channel. The second stage 358 then continues to compact the particles resulting in a more compact and even narrower band of particles.

Figure 13A:
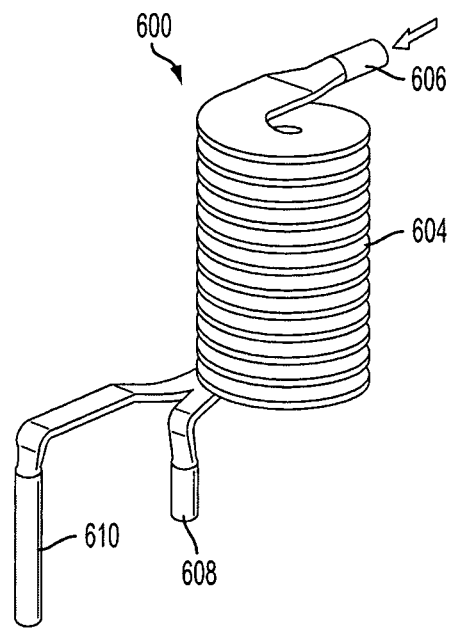
FIGS. 13(a)-13(b) illustrate a form of the presently described embodiments.

With reference now to FIGS. 13(a) and (b), a still further embodiment is shown. In FIGS. 13(a) and (b), a spiral device 600 according to the presently described embodiments is illustrated. In this embodiment, the spiral device 600 takes the form of a helical spiral. In this regard, the spiral body portion of the device 604 is a helical spiral that has an inlet 606, a first outlet 608 and a second outlet 610. It will be appreciated that this single channel helical structure resembles a hollow "slinky" type device with the shape of a coiled spring. This device may be fabricated in a variety of manners including in sections using injection molding techniques. The sections are then fused together using known processes before use. Another process for fabricating this device includes the use of extrusion molding techniques wherein the extruded plastic can be air-cooled or dipped in a liquid bath to solidify to its desired shape and structure. The helical coiling can be achieved by controlling the rotation of either the extrusion mandril or the cooling bath. A variety of different material can be used, including thermal plastics such as PVC with Shore "A" hardness, high density polyethylene, polypropylene, polystyrene, and polycarbonate.

Figure 13B:
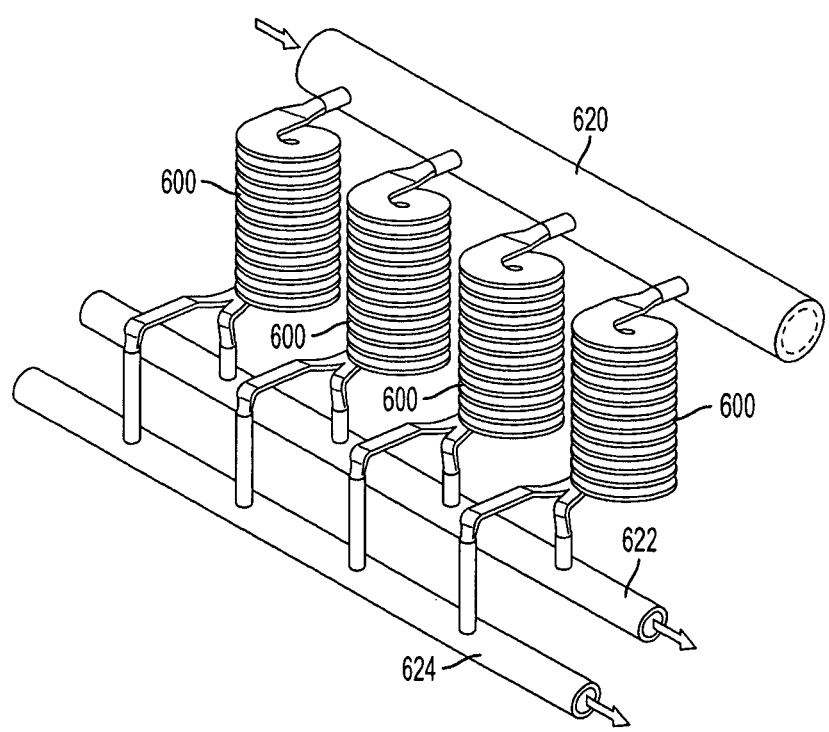

As shown in FIG. 13(b), a spiral device such as that shown in FIG. 13(a) can be disposed in a parallel arrangement to increase throughput of the system. As shown, spiral devices 600 are all connected to an input main 620 from a fluid manifold and the respective first outlets of the devices 600 are connected to a first outlet main 622. The second outlets of the devices 600 are connected to a second outlet main 624.

Figure 14A:
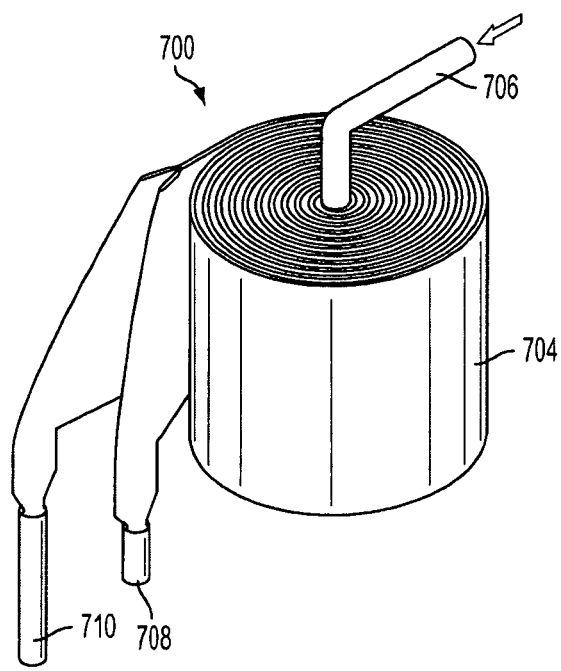
FIGS. 14(a)-14(c) illustrate a form of the presently described embodiments.
Figure 14B:
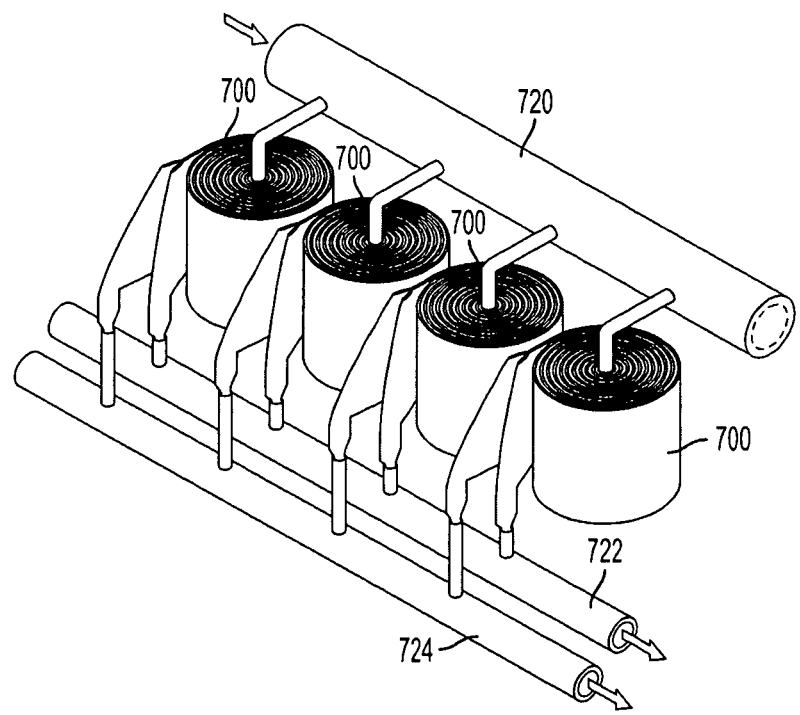
Figure 14C:
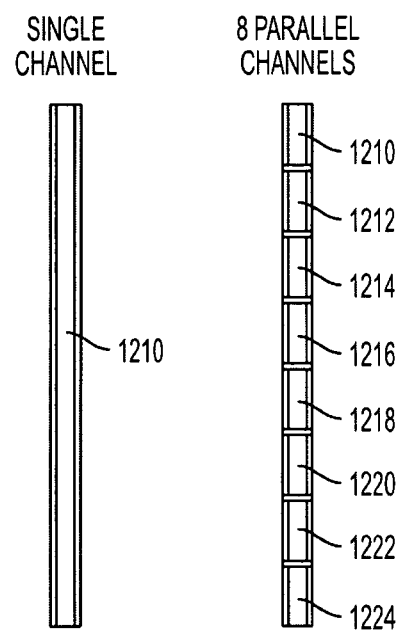

With reference to FIGS. 14(*a*) through 14(*c*), a similar system having vertically stacked parallel channels is shown. However, the embodiment of FIG. 14(*a*) shows a spiral device 700 that is a spiral wound device. This device 700 includes a spirally wound body 704 having inlet 706, a first outlet 708 and a second outlet 710. Such a device may be fabricated by introducing rib structures on a web-fed Mylar-like plastic (or fluid impermeable) material. The rib structures may be formed using quick-set epoxy printing techniques.

As with the embodiment illustrated in FIGS. 13(*a*) and 13(*b*), the device 700, as shown in FIG. 14(*b*), may be disposed in a system wherein a plurality of devices 700 are connected in parallel to a water inlet main 720 from a fluid manifold. Similarly, the first outlet lines for the devices are connected to a first outlet main 722. The second outlet lines of the devices 700 are connected to a second outlet main 724.

With reference to FIG. 14(*c*), it will be appreciated that the body 704 may be comprised of a single channel 1210, or a plurality of channels 1210-1224. Of course, any number or form of channels will suffice.

Moreover, it should be appreciated that any of the spiral or other devices described or contemplated herein may be disposed in a cascaded manner or in a parallel manner, as shown in FIGS. 13(*a*), 13(*b*), 14(*a*) and 14(*b*). Those actually shown are merely examples. Still further, any suitable material may be used to form the devices contemplated herein.

Figure 15:
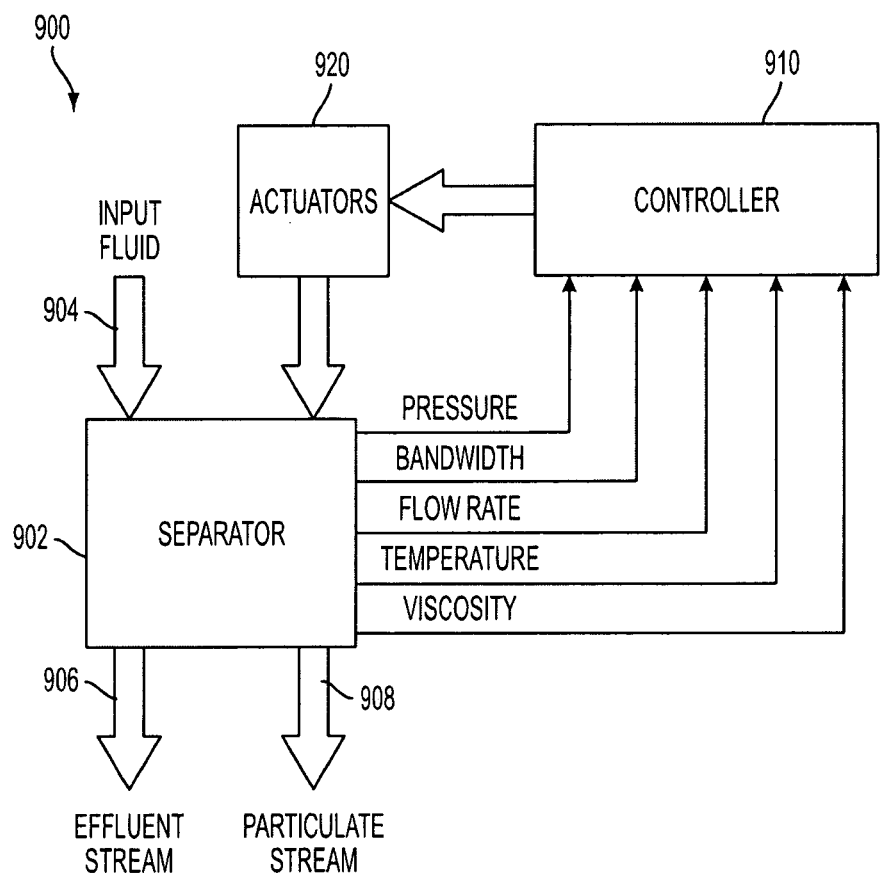
FIG. 15 illustrates a form of the presently described embodiments.

With reference now to FIG. 15, an example feedback and control system 900 is illustrated. As shown, a separator 902 (which could take the form of any of the spiral or other separators contemplated by the presently described embodiments or others) receives input fluid 904 and processes it to achieve an effluent stream 906 and a particulate stream 908. As alluded to above, the system 900 may use various items of data, such as pressure, bandwidth, flow rate, temperature or viscosity—all of which may be measured using suitable sensors. The data is fed to a controller 910 that controls various actuators 920 that are operative to modify the performance of the device 902 in a desired manner.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A particle separation system comprising:
   a plurality of individual curved particle separation devices, each particle separation device being planar and having a curved channel, stacked such that the devices are parallel to one another;
   an inlet coupler connected to all inlets of the devices, the inlet coupler being operative to facilitate input of fluid to all inlets of the plurality of individual curved particle separation devices;
   at least two outlet couplers connected to the corresponding outlets of the plurality of individual curved particle separation devices, wherein each particle separation device achieves separation between outlet couplers based on flow driven forces generated by fluid flow in curved channels of the curved particle separation devices, the flow driven forces including centrifugal forces and at least flow pressure forces or buoyancy forces; and,
   a controller configured to control the separation devices based on at least one of pressure, bandwidth, flow rate, temperature and viscosity.

2. The system as set forth in claim 1 wherein the curved particle separation devices are spiral devices.

3. The system as set forth in claim 1 wherein the curved particle separation devices comprise curved portions that span between 180 degrees and 360 degrees of angular distance along a diameter thereof.

4. The system as set forth in claim 1 further comprising a feedback system.

5. The system as set forth in claim 4 wherein the feedback system feeds data relating to at least one of pressure, flow rate, bandwidth, viscosity, and temperature to the controller.

6. The system as set forth in claim 1 further comprising at least a second plurality of stacked curved particle separation devices arranged in parallel with the plurality of stacked curved particle separation devices.

7. A particle separation system comprising:
   an inlet manifold;
   a plurality of separation channels facilitating fluid flow therein and arranged in a helical spiral configuration wherein the channels are parallel to one another, wherein each separation channel achieves separation for the fluid flow based on flow driven forces generated by the fluid flow in the channel, the flow driven forces including centrifugal forces and at least flow pressure forces or buoyancy forces;
   an output manifold wherein the output manifold includes a portion therein operative to split the fluid flow from each of the channels and wherein the portion is a static collar portion; and,
   a controller configured to control the separation channels based on at least one of pressure, bandwidth, flow rate, temperature and viscosity.

8. A particle separation system comprising:
   an inlet manifold;
   a plurality of separation channels facilitating fluid flow therein and arranged in a helical spiral configuration wherein the channels are parallel to one another, wherein each separation channel achieves separation for the fluid flow based on flow driven forces generated by the fluid flow in the channel, the flow driven forces including centrifugal forces and at least flow pressure forces or buoyancy forces;
   an output manifold wherein the output manifold includes a portion therein operative to split the fluid flow from each of the channels and wherein the portion is a substantially circular collar portion; and,
   a controller configured to control the separation channels based on at least one of pressure, bandwidth, flow rate, temperature and viscosity.

9. A particle separation system comprising:
   an inlet manifold;
   a plurality of separation channels facilitating fluid flow therein and arranged in a helical spiral configuration wherein the channels are parallel to one another, wherein each separation channel achieves separation for the fluid flow based on flow driven forces generated by the fluid flow in the channel, the flow driven forces including centrifugal forces and at least flow pressure forces or buoyancy forces;

an output manifold wherein the output manifold includes a portion therein operative to split the fluid flow from each of the channels and wherein the portion is comprised of curves to provide a continuously adjustable split of the fluid flow; and, a controller configured to control the separation channels based on at least one of pressure, bandwidth, flow rate, temperature and viscosity.

10. A particle separation system comprising:

an inlet manifold;

a plurality of separation channels facilitating fluid flow therein and arranged in a helical spiral configuration wherein the channels are parallel to one another, wherein each separation channel achieves separation for the fluid flow based on flow driven forces generated by the fluid flow in the channel, the flow driven forces including centrifugal forces and at least flow pressure forces or buoyancy forces;

an output manifold wherein the output manifold includes a portion therein operative to split the fluid flow from each of the channels and wherein the portion is comprised of discrete step segments to provide a step-wise adjustable split of the fluid flow; and, a controller configured to control the separation channels based on at least one of pressure, bandwidth, flow rate, temperature and viscosity.

11. A particle separation system comprising:

an inlet manifold;

a plurality of separation channels facilitating fluid flow therein and arranged in a helical spiral configuration wherein the channels are parallel to one another, wherein the plurality of separation channels is arranged in a first stage and a second stage, wherein the first stage and second stage are separated by a fluid inverter and wherein each separation channel achieves separation for the fluid flow based on flow driven forces generated by the fluid flow in the channel, the flow driven forces including centrifugal forces and at least flow pressure forces or buoyancy forces;

an output manifold wherein the output manifold includes a portion therein operative to split the fluid flow from each of the channels; and, a controller configured to control the separation channels based on at least one of pressure, bandwidth, flow rate, temperature and viscosity.

12. A particle separation system comprising:

receiving fluid having particles distributed therein through an inlet coupler connected to all inlets of a plurality of individual curved particle separation devices stacked such that the devices are parallel to one another;

separating the particles in each individual curved particle separation device into a first portion or band of the fluid having selected particles therein and a second portion of the fluid without such particles, the separation being achieved based on flow driven forces generated by fluid flow in curved channels of the individual curved particle separation devices, the flow driven forces including centrifugal forces and at least flow pressure forces or buoyancy forces;

controlling the separation devices based on at least one of pressure, bandwidth, flow rate, temperature and viscosity; and, outputting the first portions or bands of the fluid as a particulate stream and the second portion of the fluid as an effluent stream through corresponding outlet couplers connected to the corresponding outlets of each of the plurality of individual curved particle separation devices.

13. The method as set forth in claim 12 further comprising measuring at least one of the pressure, the flow rate, the bandwidth, the viscosity, and the temperature of the fluid flow and controlling the separation devices by modifying the fluid flow based on the measuring.

14. The system as set forth in claim 1 wherein each channel is enclosed or sealed.

15. A particle separation system comprising:

a stack of individual curved particle separation devices, each particle separation device being planar and having a curved channel;

an inlet coupler connected to all inlets of the devices, the inlet coupler being operative to facilitate input of fluid to all inlets of the plurality of individual curved particle separation devices;

at least two outlet couplers connected to the corresponding outlets of the plurality of individual curved particle separation devices, wherein each particle separation device achieves separation between outlet couplers based on flow driven forces generated by fluid flow in curved channels of the curved particle separation devices, the flow driven forces including centrifugal forces and at least flow pressure forces or buoyancy forces; and, a controller configured to control the separation devices based on at least one of pressure, bandwidth, flow rate, temperature and viscosity.

16. The system as set forth in claim 15 wherein each channel is enclosed or sealed.

17. The system as set forth in claim 15 wherein the particle separation devices are stacked in a parallel configuration.

18. The system as set forth in claim 15 wherein the curved particle separation devices are spiral devices.

19. The system as set forth in claim 15 wherein the curved particle separation devices comprise curved portions that span between 180 degrees and 360 degrees of angular distance along a diameter thereof.

20. The system as set forth in claim 15 further comprising a feedback system.

21. The system as set forth in claim 20 wherein the feedback system feeds data relating to at least one of pressure, flow rate, bandwidth, viscosity, and temperature to the controller.

22. The system as set forth in claim 15 further comprising at least a second plurality of stacked curved particle separation devices arranged in parallel with the plurality of stacked curved particle separation devices.

23. The system as set forth in claim 7 further comprising a feedback system.

24. The system as set forth in claim 8 further comprising a feedback system.

25. The system as set forth in claim 9 further comprising a feedback system.

26. The system as set forth in claim 10 further comprising a feedback system.

27. The system as set forth in claim 11 further comprising a feedback system.

* * * * *